Dec. 16, 1958    D. MacD. PATERSON    2,864,491
RECEPTACLES FOR HOLDING SLIDES
Filed June 10, 1957    2 Sheets-Sheet 1
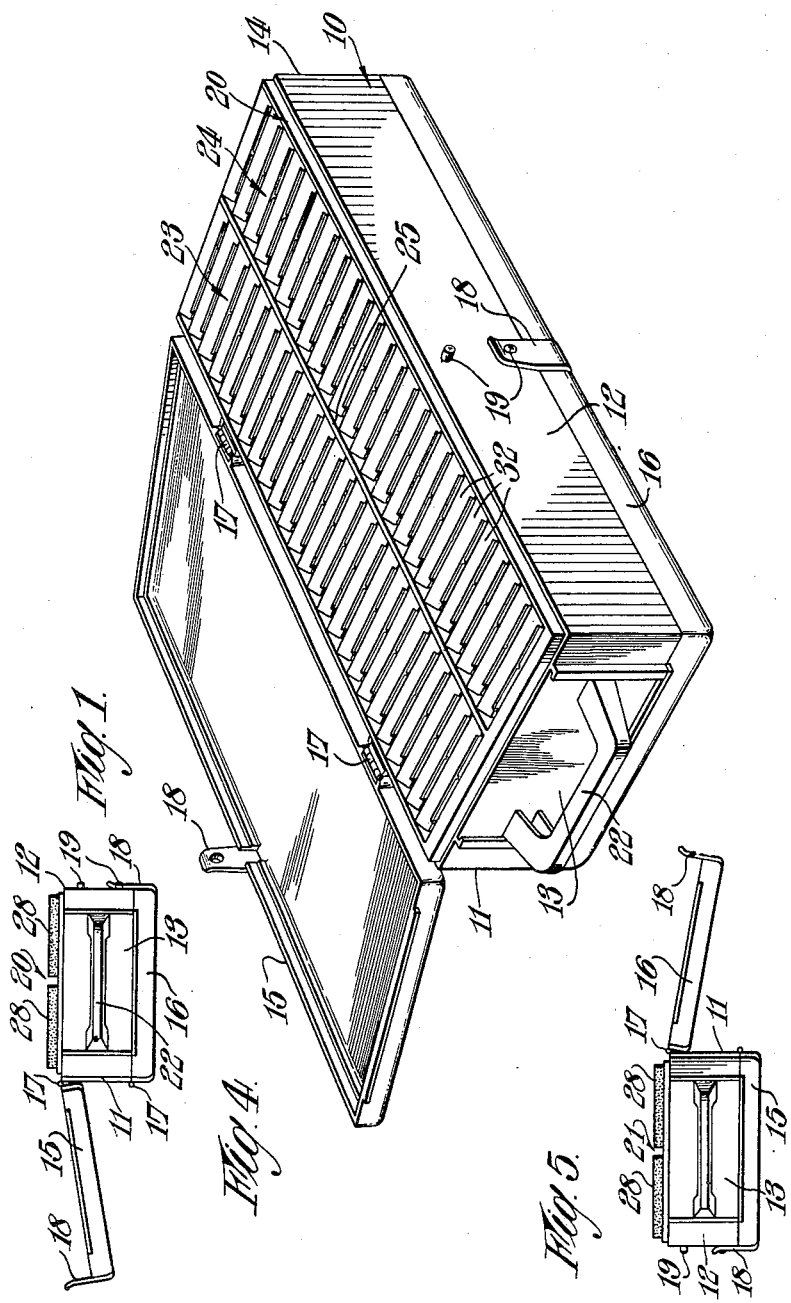

Dec. 16, 1958  D. MacD. PATERSON  2,864,491
RECEPTACLES FOR HOLDING SLIDES
Filed June 10, 1957  2 Sheets-Sheet 2
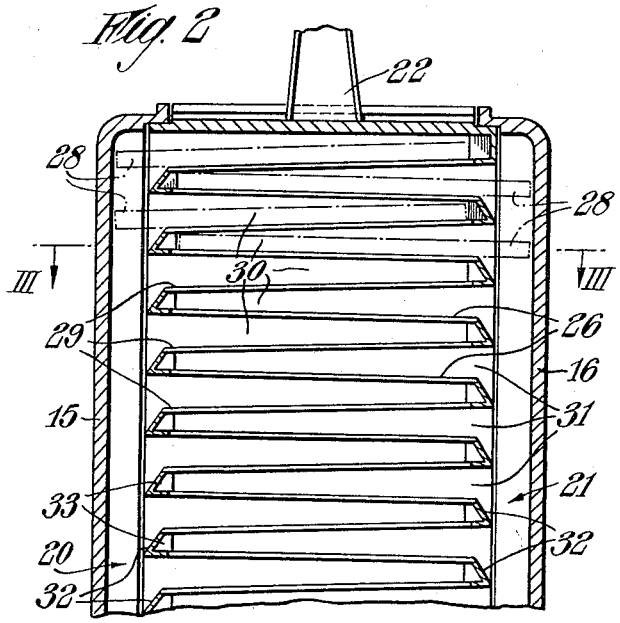
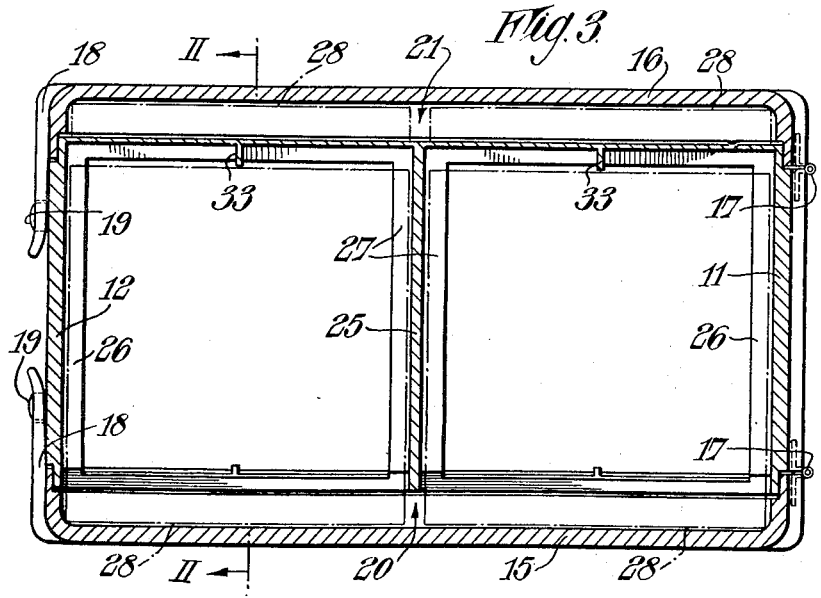

United States Patent Office 2,864,491
Patented Dec. 16, 1958

2,864,491

RECEPTACLES FOR HOLDING SLIDES

Donald MacDougal Paterson, London, England

Application June 10, 1957, Serial No. 664,592

4 Claims. (Cl. 206—1)

This invention concerns receptacles for holding slides and relates more particularly to slides for holding film transparencies such as are now commonly used in conjunction with a projector for showing transparencies (e. g. colour transparencies) on a screen. However, the invention is not so limited and the receptacle may be used to hold microscope slides or the like.

Receptacles are known in which the slides are each supported in guides (e. g. slots) in the opposite walls of a box. To enable a slide to be gripped between the fingers for removal the slides must be spaced apart to some extent so that the number of slides which may be housed in a row, without making the box unduly long, is relatively small.

This invention has for its object to provide a receptacle in which a large number of slides may be stored in a limited space while ensuring that each slide may be readily removed as required.

According to this invention a receptacle for slides or the like comprises a first open side, a second open side directly opposite said first side, spaced substantially parallel slide supports extending from one open side to the other open side and for each support a stop means, the latter being disposed inwardly of the first side on alternate supports and inwardly of the second side for the remaining supports and a closure for each open side. With this arrangement slides are inserted to the supports from say the first side and the stop means associated with said supports limits the extent of inward movement of the slides, and similarly other slides are inserted to the supports from the second side and their movement is limited by the associated stop means. Accordingly, when the slides are in position alternate slides exposed at the first open side project outwardly beyond the other slides and there is a space defined on each side of the projections so that said alternate slides may be readily grasped for removal. A similar arrangement exists for the second open side—those slides which are set back from the remainder at the first open side projecting outwardly beyond the others at the second open side. The slides may be closely superposed (so that the length of the box is not great) while enabling ready withdrawal, and since the set of slides inserted from the first open side overlap the set of slides inserted from the second side and width or height of the box is also not great.

A practical arrangement of the present invention will now be described, by way of example only, with reference to the accompanying drawings whereof:

Fig. 1 is a perspective view of a box-like receptacle for storing coloured transparencies, Fig. 2 is a sectional elevation on the line II—II of Fig. 3, Fig. 3 is a sectional plan on the line III—III of Fig. 2, Fig. 4 is an end view of the box receptacle showing the box open for the removal of the coloured transparencies from one side of the box, and Fig. 5 is a view similar to Fig. 4 showing the box open for removal of coloured transparencies from the other side of the box.

Referring to Fig. 1 of the drawings: the box receptacle is generally indicated by the reference numeral 10 and comprises opposite parallel sides 11, 12, ends 13, 14 and a pair of lids 15, 16 each of which is hinged, at 17, to sides 11, 12 respectively and each of which is formed with a latch 18 to engage a button 19 on the side 12. The lids 15, 16 close a pair of opposite sides 20, 31 through which the transparencies are removed from and replaced in, the box 10 as will later be described.

The end 13 is provided or formed with a handle 22 so that the box may be conveniently carried.

Between the open sides 20, 21 there are two rows of guides to support the transparencies, one of the rows being indicated generally at 23 in Fig. 1 and the other row at 24, the rows 23, 24 being separated by a partition 25 which extends completely through from one open side to the other.

The construction of one of the rows of guides 23, 24 will now be described it being understood that the other row of guides is identical therewith. Two rows are provided so as to accommodate a sufficient number of transparencies in the box 10 but the box may contain one row only or more than two rows this being purely a matter of convenience.

The row 23 (and 24) comprises a plurality of spaced, substantially parallel guides which extend from one open side to the other, the guides being arranged in pairs one of which, indicated at 26, is carried by the inner surface of a side of the box (i. e. side 11 and 12), and the other of which, indicated at 27, is carried by a surface of the partition 25 which faces the side 11 (see Fig. 3). Each pair of guides 26, 27 is adapted to receive and support a transparency (which for convenience, is shown chain-dotted at 28) through the open side 21. Guides similar to the guides 26, 27 and carried by the sides of the box and by partition 25 are intercalated with guides 26, 27. Only guides 29 of the intercalated guides are shown in the drawing (see Fig. 2). These intercalated guides are adapted to receive transparencies 28 through the open side 20.

The transparencies 28 are introduced to slide-receiving spaces 30 through openings 31, each of the spaces 30 being closed by a stop 32 which limits the inward movement of a transparency. The stops 32 are so arranged that when the transparencies are fully inserted into the spaces 30 and are supported at their edges each by a pair of guides the end of each transparency projects through an opening 20 or 21 into the space within the lid 15 or 16, which is recessed. Thus, as shown in Fig. 2, the transparencies project beyond the stops 32 to within the lids, this being the arrangement with respect to both rows 23, 24 and also with respect to both open sides 20, 21.

The stop means 32 comprises a bar which completely closes the far end of the guide space 30. As more clearly shown in Fig. 2 the exposed or outer face of the bar stop 32 is flat and is inwardly inclined to lead into the guide space. Accordingly a transparency 28 when being inserted into a guide space 30 which engages the exposed face of the stop bar 32 is deflected thereby into the appropriate guide space. It will be observed also in Fig. 2 that the guides 26, 29 are arranged so that one is in line with the upper edge of the bar stop and the other is in line with the lower edge of said stop and that the pair of guides 26, 29 for each bar stop converge slightly in the direction in which the transparencies are inserted into the guide space (the guides slope gently in the same direction as the exposed face of bar 32) so that there is a small amount of sideways movement of a transparency within the guide space. This enables more space to be made available to grip the projecting ends of the transparencies during removal as well as simplifying the insertion of the transparencies.

The bar stops may carry a name, title or number of the transparency above or below it (as is most appropriate) for identification purposes.

In the particular arrangement being described each bar stop comprises a flat surface which is inclined at an acute angle and there is a reinforcing rib 33 on the said surface so that the bar is relatively rigid.

In use: for each of the rows 23, 24 a series of transparencies are inserted through the opening 20 and a second series of transparencies through the opening 21. When the lid 15 is opened the transparencies which project through the opening 20 are accessible. Such an arrangement is shown in Fig. 4 wherein the box is shown as placed flat on a table with the lid 15 fully open to expose the opening 20. The ends of the transparencies 28 project through said opening and can therefore be removed. Each pair of adjacent transparencies which project through the opening 20 is separated by one of the bar stops 32 and the thickness of the bar stops is such that the fingers can readily be inserted to between the transparencies to grip one of the transparencies for removal. When the lid 15 is closed and the box turned over so that it rests on the lid 15 and thereafter the lid 16 is opened the opening 21 is exposed with the transparencies 28 projecting therethrough. As already described the transparencies may readily be removed since each pair of transparencies is separated by a bar stop 32.

It will be appreciated from Fig. 2 that the maximum storage use is made of the box 10 since a transparency lies behind each of the bar stops but, nevertheless although there are the maximum number of transparencies in the box each transparency is readily removable since each pair of transparencies are spaced by a bar stop.

Also as shown in Fig. 2 the transparencies are arranged to project through the openings 20, 21 to such an extent that the ends lie close to the inner surface of the lid 15 or 16. In this way the transparencies are adequately held in position within the box.

It is preferred that the box 10, the partition 25, the guides 26, 27, 29 and the bar stops 32 be formed in one piece by a moulding operation from a synthetic resin material.

While the invention has particular application to a box receptacle for storage of transparencies, nevertheless, the invention may be applied to a receptacle for the storage of microscope slides, spools of magnetically recorded tape, gramophone records, record cards, or similar flat articles.

I claim:

1. A receptacle for slides comprising a rectangular frame having opposite side and end walls and having openings at its top and bottom, closures on said frame for said top and bottom openings, a first plurality of spaced and substantially parallel slide supports projecting inwardly from one of said side walls and extending in a direction from one opening towards the other opening, a second plurality of spaced and substantially parallel slide supports projecting inwardly from the other of said side walls and extending in opposed and parallel relation with said first plurality of slide supports, a first plurality of spaced and parallel stop means disposed over one of said openings and extending from one side wall to the other side wall, and a second plurality of spaced and substantially parallel stop means disposed over the other of said openings and extending from one side wall to the other side wall, the stop means of each of said pluralities being disposed opposite the spaces between the stop means of the other of said pluralities, each stop means being connected to the ends of an adjacent pair of slide supports at one side wall and being connected to the opposed adjacent pair of slide supports on the other side wall, each plurality of stop means being arranged relative to said slide supports such that the spaces between adjacent slide supports along each opening are alternately closed and open, each stop means being spaced away from its nearer closure, the distance from each stop means to the other closure being only slightly greater than the length of the slide to be received in the space between the corresponding slide supports.

2. A receptacle for slides comprising a rectangular frame having opposite side and end walls and having openings at its top and bottom, closures on said frame for said top and bottom openings, a first plurality of spaced and substantially parallel slide supports projecting inwardly from one of said side walls and extending in a direction from one opening towards the other opening, a second plurality of spaced and substantially parallel slide supports projecting inwardly from the other of said side walls and extending in opposed and parallel relation with said first plurality of slide supports, a first plurality of spaced and parallel flat bars disposed over one of said openings and extending from one side wall to the other side wall, and a second plurality of spaced and substantially parallel flat bars disposed over the other of said openings and extending from one side wall to the other side wall, the bars of each of said pluralities being disposed opposite the spaces between the bars of the other of said pluralities, each bar being connected to the ends of an adjacent pair of slide supports at one side wall and being connected to the opposed adjacent pair of slide supports on the other side wall, each plurality of bars being arranged relative to said slide supports such that the spaces between adjacent slide supports along each opening are alternately closed and open, each bar being spaced away from its nearer closure, the distance from each bar to the other closure being only slightly greater than the length of the slide to be received in the space between the corresponding slide supports.

3. A receptacle for slides comprising a rectangular frame having opposite side and end walls and having openings at its top and bottom, closures on said frame for said top and bottom openings, a first plurality of spaced and substantially parallel slide supports projecting inwardly from one of said side walls and extending in a direction from one opening towards the other opening, a second plurality of spaced and substantially parallel slide supports projecting inwardly from the other of said side walls and extending in opposed and parallel relation with said first plurality of slide supports, a first plurality of spaced and parallel bars disposed over one of said openings and extending from one side wall to the other side wall, and a second plurality of spaced and substantially parallel flat bars disposed over the other of said openings and extending from one side wall to the other side wall, the bars of each of said pluralities being disposed opposite the spaces between the bars of the other of said pluralities, each bar being connected to the ends of an adjacent pair of slide supports at one side wall and being connected to the opposed adjacent pair of slide supports on the other side wall, each plurality of bars being arranged relative to said slide supports such that the guide spaces between adjacent slide supports along each opening are alternately closed and open, each bar being spaced away from its nearer closure, the distance from each bar to the other closure being only slightly greater than the length of the slide to be received in the guide space between the corresponding slide supports, the exposed face of each bar being flat and inclined inwardly towards a next adjacent guide space.

4. A receptacle for slides comprising a rectangular frame having opposite side and end walls and having openings at its top and bottom, closures on said frame for said top and bottom openings, a first plurality of spaced and substantially parallel slide supports projecting inwardly from one of said side walls and extending in a direction from one opening towards the other opening, a second plurality of spaced and substantially parallel slide supports projecting inwardly from the other of said side walls and extending in opposed and parallel relation with said first plurality of slide supports, a first plurality of spaced and parallel bars disposed over one of said openings and extending from one side wall to the other side wall, and a second plurality of spaced and substantially parallel flat bars disposed over the other of said openings and extending from one side wall to the other side wall, the bars of each of said pluralities being disposed opposite the spaces between the bars of the other of said pluralities, each bar being connected to the ends of an adjacent pair of slide supports at one side wall and being connected to the opposed adjacent pair of slide supports on the other side wall, each plurality of bars being arranged relative to said slide supports such that the guide spaces between adjacent slide supports along each opening are alternately closed and open, each bar being spaced away from its nearer closure, the distance from each bar to the other closure being only slightly greater than the length of the slide to be received in the guide space between the corresponding slide supports, the exposed face of each bar being flat and inclined inwardly towards a next adjacent guide space, each adjacent pair of slide supports sloping gently inwardly towards one another in the direction of the bar interconnecting their ends.

References Cited in the file of this patent

UNITED STATES PATENTS

| | | |
|---|---|---|
| 368,720 | Johnston | Aug. 23, 1897 |
| 638,126 | Kampee | Nov. 28, 1899 |
| 721,532 | Baron | Feb. 24, 1903 |
| 1,809,781 | Gross | June 9, 1931 |
| 2,680,535 | Thon | June 8, 1954 |